Figures 1, 2:
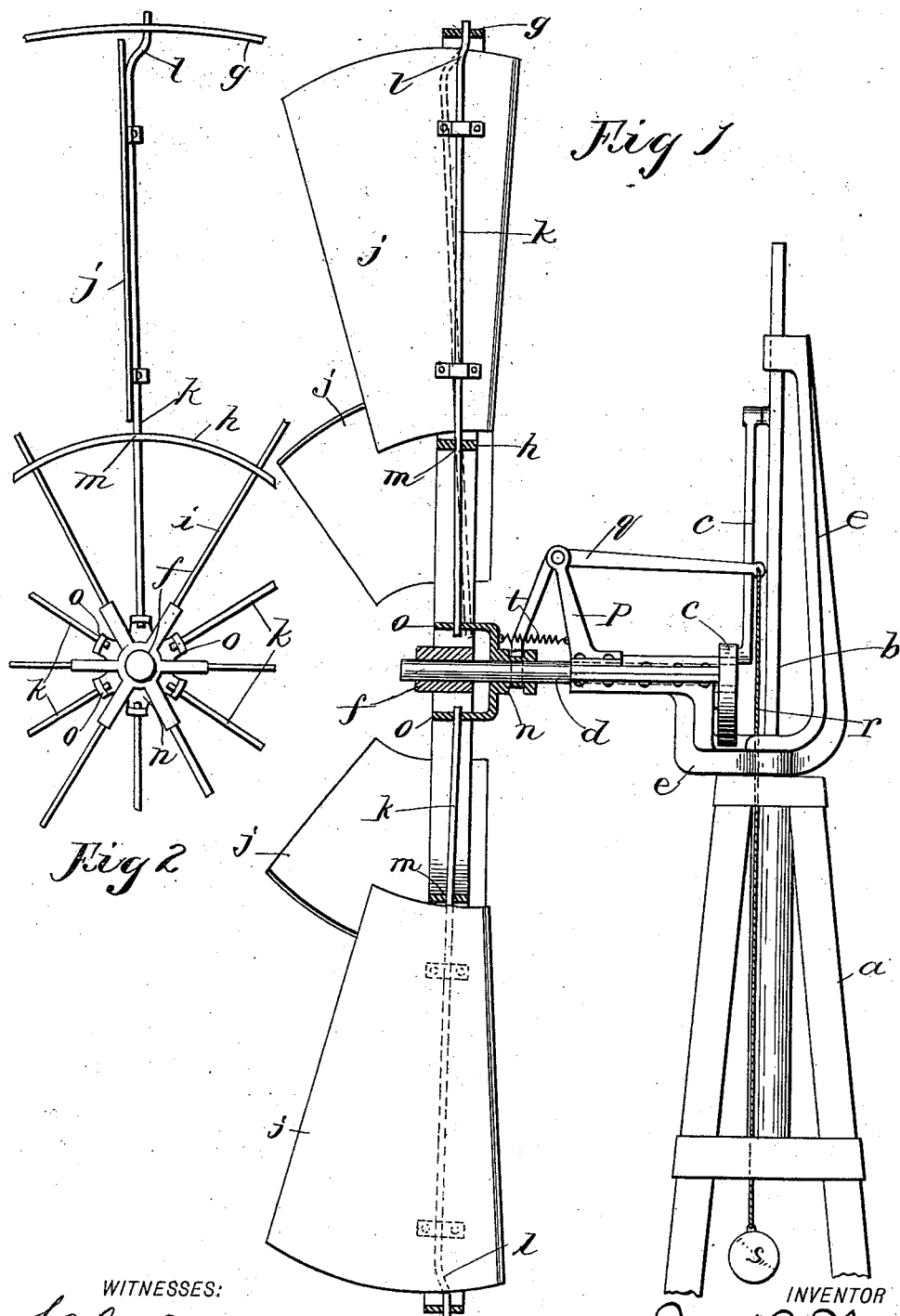

(No Model.)

J. H. WOLF.
WIND WHEEL.

No. 510,306. Patented Dec. 5, 1893.

WITNESSES:

INVENTOR
J. H. Wolf
BY O. E. Duffy
ATTORNEY.

UNITED STATES PATENT OFFICE.

JOHN H. WOLF, OF RANSOM, ASSIGNOR OF ONE-HALF TO EUGENE DENEL, OF GENEVA, AND EDWARD G. WOLF, OF HUDSON, MICHIGAN.

WIND-WHEEL.

SPECIFICATION forming part of Letters Patent No. 510,306, dated December 5, 1893.

Application filed March 20, 1893. Serial No. 466,923. (No model.)

*To all whom it may concern:*

Be it known that I, JOHN H. WOLF, of Ransom, in the county of Hillsdale and State of Michigan, have invented certain new and useful Improvements in Wind-Wheels; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in wind mills.

The object of the invention is to provide an improved wind wheel or mill, exceedingly simple, cheap, and durable in construction and composed of a minimum number of parts, and wherein the wheel is so constructed as to automatically regulate its speed, and so that when the wind increases to such velocity as to drive the wheel faster than the speed to which it is adjusted, the sails or blades will automatically turn out of the wind and thereby govern the speed of the wheel or entirely stop the wheel as the case may be.

The invention consists in certain novel features of construction and in combinations of parts more fully described hereinafter and particularly pointed out in the claims.

Referring to the accompanying drawings: Figure 1 is a vertical sectional view taken through the wheel, showing the upper portion of the tower and the operating gear in elevation. Fig. 2 is a front view showing a portion of the wheel and one of the blades or fans in the position it assumes when turned entirely out of the wind so that the wheel will stop.

In the drawings the reference letter $a$, indicates a suitable tower.

$b$, indicates the reciprocating pitman.

$c$, indicates gear for driving said pitman from the wind wheel shaft $d$. I do not herein specifically describe this gearing as it forms no part of my invention.

$e$ indicates a suitable frame or support adapted to rotate on the tower and turn with the wind wheel shaft and the wind wheel.

The wind wheel comprises the outer circular rim $g$, the hub $f$, the radial arms or spokes $i$, connecting the hub and the rim, and the fulcrum frame or ring $h$, connecting the spokes $i$, between the hub and the outer rim.

$j$, indicates the fans or blades of the mill, which are carried by the lever shafts $k$, radially located in the wheel, and at their outer ends journaled in the rim $g$, and at their inner ends journaled in the arms $o$, located between the spokes of the wheel and forming a part of the sleeve $n$, loosely located on the wind wheel shaft. This sleeve $n$, is longitudinally movable on the wind wheel shaft and rotates therewith. The outer ends of the lever shafts $k$, are provided with the lateral bends or cranks $l$, just within the rim $g$. The lever shafts $k$, pass through the fulcrumed frame $h$, forming the fulcrum points $m$. By means of the cranks or bends $l$ in the lever shafts, the upper or outer bearings of the lever shafts are thrown to one side of the axial lines of said shafts so that when the sleeve $n$, is moved longitudinally of the wind wheel shaft, the lever shafts are swung on the points $m$ as fulcrums, and when so swung the cranks or bends at the upper ends of said shafts turn the shafts to partially rotate in the various bearings and thereby change the angle of the blades or fans. This is clearly shown by dotted lines in Fig. 1. The cranks $l$, and the parts are so arranged that when the sleeve $n$, is at its limit of outward movement toward the outer end of the wind wheel shaft the blades will be set at the proper angle so that the wind wheel will run at full speed, and so that when the sleeve $n$, is drawn into the inner end of the wind wheel shaft the blades will be gradually thrown outwardly at right angles to the plane of the shaft so as to present no surface at all to the action of the wind and so that the wheel will not be rotated by the wind.

$q$, indicates an elbow lever fulcrumed on the arm $p$, from the frame $e$ and at its lower and outer end entering a groove in the sleeve $n$, so as to permit said sleeve to rotate independently of the lever, but so that the lever will throw the sleeve longitudinally on the wind wheel shaft. The horizontal arm of this lever $q$, is connected by any suitable flexible connection r, with the weight s, so that the weight will tend to throw the sleeve n, to its limit of outward movement and hence yieldingly hold the blades or fans of the wind wheel at the proper angle to rotate the wheel by the wind. It will thus be readily seen that when the speed of the wind increases beyond a certain degree, the blades will be gradually swung around to present their edges to the wind, thereby turning and at the same time swinging the lever shafts k, on the fulcrum points m, and throwing the sleeve n inwardly and thereby rocking the shaft q to raise the weight s, this action being entirely against the pull of the weight s, so that as the wind gradually decreases the blades will be gradually thrown around into their normal positions, and as the wind gradually increases the blades will be thrown around to present a less surface to the action of the wind.

The action of the wind wheel is entirely automatic, as will be readily seen from the foregoing description.

If desired a spring t, can be provided to constantly tend to throw the sleeve n, toward the inner end of the wind wheel shaft and assist in throwing the wheel out of gear.

It is evident that various slight changes might be made in the forms, constructions and arrangements of the parts described without departing from the spirit and scope of my invention. Hence I do not wish to limit myself to the construction herein set forth.

Having fully described my invention, what I claim as new, and desire to secure by Letters Patent of the United States, is—

1. In a wind wheel, the combination of a shaft, a rim and spokes, an intermediate fulcrum frame, the blades, and the lever shafts carrying said blades journaled in a movable support at their inner ends and in the rim at their outer ends and provided with lateral bends or cranks at their outer ends, said lever shafts passing through said fulcrum frame which forms fulcrums therefor, substantially as described.

2. A wind wheel having the turnable blades carried by lever shafts so arranged that the outer bearings of the shafts are to one side of the axial lines of the shafts, and a yieldingly held movable support forming the bearings for the inner ends of said shafts, substantially as described.

3. In a wind wheel, the combination, of the shaft having the wheel comprising the outer rim, a fulcrum frame, the turnable blades, a longitudinally movable sleeve on the shaft yieldingly held to its limit of movement in one direction, the lever shafts having the lateral bends at their outer ends, said shafts journaled in the rim and said sleeve and passing through said fulcrum frame, as and for the purposes set forth.

4. In combination, the shaft, a hub thereon having the spokes connected by the outer rim and the fulcrum frame, the longitudinally movable sleeve on the shaft having the arms, a spring acting on said sleeve, a lever acting on the sleeve and controlled by a weight, the blades, and the lever shafts to which said blades are secured, said shafts journaled at their inner and outer ends respectively in said arms and said rim and passing through said fulcrum frame, said shafts having the bends at their outer ends.

In testimony that I claim the foregoing as my own I affix my signature in presence of two witnesses.

JOHN H. WOLF.

Witnesses:
EDWIN SCOTT,
PHILANDER POWERS.